United States Patent
Sugahara

(10) Patent No.: US 8,684,480 B2
(45) Date of Patent: Apr. 1, 2014

(54) POSTURE DETECTING DEVICE, RECORDING APPARATUS INCLUDING THE SAME, LENTICULAR SHEET, AND METHOD FOR DETECTING POSTURE OF MEDIUM

(75) Inventor: Hiroto Sugahara, Ama (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 140 days.

(21) Appl. No.: 13/360,025

(22) Filed: Jan. 27, 2012

(65) Prior Publication Data

US 2012/0236050 A1     Sep. 20, 2012

(30) Foreign Application Priority Data

Mar. 17, 2011  (JP) ................................ 2011-058887

(51) Int. Cl.
  *B41J 3/00*   (2006.01)
(52) U.S. Cl.
  USPC .............................................. 347/2; 347/104
(58) Field of Classification Search
  USPC ................. 347/2, 19, 104; 358/1.9; 399/407
  See application file for complete search history.

(56) References Cited

U.S. PATENT DOCUMENTS 5,812,152 A * 9/1998 Torigoe et al. ..................... 347/2
6,076,915 A * 6/2000 Gast et al. ........................ 347/19
6,133,928 A   10/2000 Kayashima et al.
6,320,673 B1 * 11/2001 Motosugi ........................ 358/1.9
2010/0322692 A1 * 12/2010 Iguchi et al. .................. 399/407

FOREIGN PATENT DOCUMENTS

| JP | H04-052507 | 2/1992 |
| JP | 8137034 | 5/1996 |
| JP | 9015766 | 1/1997 |
| JP | 2003/011406 | 1/2003 |
| JP | 2005-186461 | 7/2005 |
| JP | 2010/030257 | 2/2010 |

OTHER PUBLICATIONS

Notice of Reasons for Rejection for Japanese Patent Application No. 2011-058887 dated Mar. 5, 2013.
Notice of Reasons for Rejection for Japanese Patent Application No. 2011-058887 dated Jul. 9, 2013.

* cited by examiner

*Primary Examiner* — Manish S Shah
*Assistant Examiner* — Yaovi Ameh
(74) *Attorney, Agent, or Firm* — Frommer Lawrence & Haug LLP

(57) ABSTRACT

There is provided a posture detecting device including: a detecting mechanism movable in a scanning direction relatively to a medium to detect a detection target; and a posture determining mechanism determining a tilt of the medium from a reference posture based on a detection result of the detection target, wherein as the detection target, the medium has a plurality of first detection targets each extending in an intersecting direction intersecting with the scanning direction at a predetermined angle and arranged at equal intervals in the scanning direction; and a plurality of second detection targets each extending in the scanning direction and arranged at equal intervals in the intersecting direction, under a condition that the medium is in the reference posture.

16 Claims, 10 Drawing Sheets

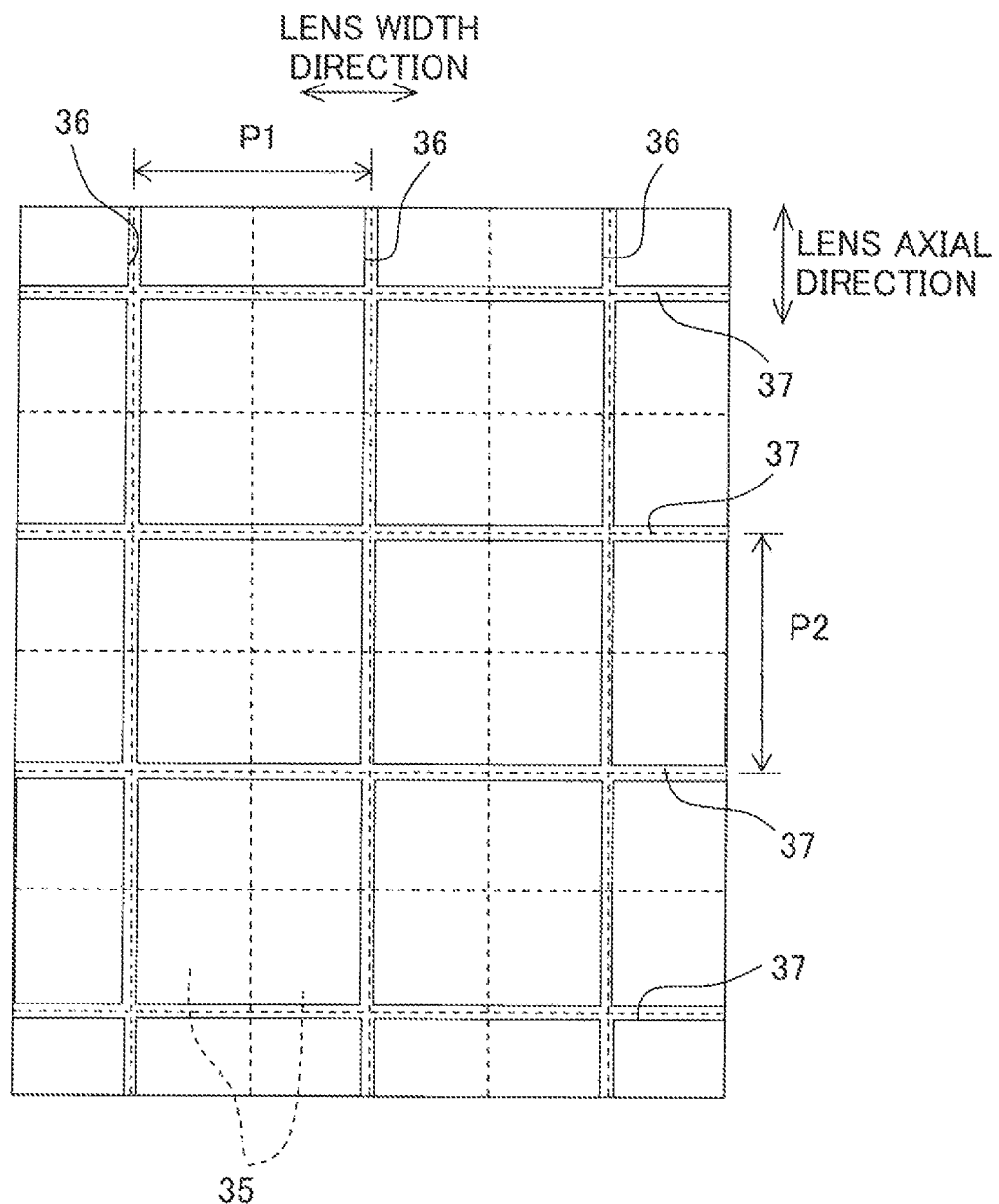

POSTURE DETECTING DEVICE, RECORDING APPARATUS INCLUDING THE SAME, LENTICULAR SHEET, AND METHOD FOR DETECTING POSTURE OF MEDIUM

CROSS-REFERENCE TO RELATED APPLICATION

The present application claims priority from Japanese Patent Application No. 2011-058887 filed on Mar. 17, 2011 the disclosure of which is incorporated herein by reference in its entirety.

BACKGROUND OF THE INVENTION

1. Field of the Invention

The present invention relates to an art to detect a posture of a medium such as a recording medium on which a recording apparatus records.

2. Description of the Related Art

An ordinary recording apparatus includes a recording head having a recording element and records an image on a recording medium by forming a large number of pixels on the recording medium by the recording element of the recording head while moving the recording head relatively to the recording medium. When, at the time of the image recording by the recording head, the recording medium is tilted in its plane from a posture that it should take, the image formed on the recording medium is tilted. Generally, this in-plane tilt of the recording medium is very small and cannot be easily detected by such a method as to detect a position of an edge of the recording medium by a sensor or the like provided in the recording apparatus. Therefore, the present inventors are considering providing, on a recording medium, detection target parts for enabling the detection of a tilt from a proper posture.

Japanese Patent Application Laid-open No. H09-15766 discloses an example where detection target parts detected by a detecting mechanism provided in a recording apparatus are provided on a recording medium. Concretely, disclosed is a lenticular sheet for stereoscopic image having: a lenticular lens including a plurality of convex lenses in a substantially columnar shape; and am image recording layer stacked on a flat surface, of the lenticular lens, opposite the convex lenses. On the flat surface, of the lenticular lens, opposite the convex lens part, a plurality of ribs corresponding to a plurality of pixel arrangement regions in the image recording layer are provided at equal intervals in a width direction of the convex lens part perpendicular to an axial direction of the convex lens part (generatrix direction), and these ribs project from the image recording layer. The recording apparatus has a carriage moving in the width direction of the convex lens part and an ink-jet head mounted on the carriage, and on the carriage, a sheet pitch sensor detecting the aforesaid ribs of the lenticular sheet is provided. The sheet pitch sensor detects the ribs of the lenticular sheet while moving with the carriage, to find positions of the pixel arrangement regions of the image recording layer, so that the ink jet head can accurately form an image.

The above-described lenticular sheet is provided with the ribs arranged at equal intervals in the width direction of the convex lens part. However, it is not possible to detect the tilt of the sheet only by detecting such ribs arranged in one direction by the sensor provided in the recording apparatus. Specifically, when the lenticular sheet is in such a posture that an arrangement direction of the ribs is parallel to the width direction of the convex lens part, it is detected that the ribs are arranged at equal intervals. On the other hand, when the lenticular sheet is tilted in its plane from the above posture by a certain angle, the ribs are also detected at equal intervals, and therefore, the above-described structure does not enable the detection of the tilt of the sheet.

SUMMARY OF THE INVENTION

It is an object of the present teaching to surely detect a tilt of a medium such as a recording medium from a predetermined posture.

According to a first aspect of the present teaching, there is provided a posture detecting device which detects a tilt from a reference posture, of a medium on which a detection target is provided, the apparatus including:

a detecting mechanism which is movable in a scanning direction relatively to the medium to detect the detection target part; and a posture determining mechanism which determines the tilt of the medium from the reference posture based on a detection result of the detection target, the detecting result being obtained by the detecting mechanism while moving in the scanning direction relatively to the medium, wherein as the detection target detected by the detecting mechanism, the medium has a plurality of first detection targets each extending in an intersecting direction intersecting with the scanning direction at a predetermined angle and arranged at equal intervals in the scanning direction; and a plurality of second detection targets each extending in the scanning direction and arranged at equal intervals in the intersecting direction, under a condition that the medium is in the reference posture.

When the medium is in the reference posture, the movement direction of the detecting mechanism (scanning direction) is parallel to the extension direction of the second detection targets (second direction). Therefore, when the recording medium is in the reference posture, only the first detection targets arranged in the second direction are detected at equal intervals by the detecting mechanism. However, when the medium is tilted (rotated) from the reference posture in a plane including the recording medium, the scanning direction of the detecting mechanism and the second direction being the extension direction of the second detection targets intersect with each other, and therefore, the second detection targets are also detected in addition to the first detection targets detected at equal intervals. From such a difference in the detection results, it is possible to detect the tilt of the posture of the medium.

According to a second aspect of the present teaching, there is provided a recording apparatus which performs recording on a medium as a recording medium, the apparatus including:

a recording head which performs recording on the recording medium while moving relatively to the recording medium;

a controller which controls the recording head; and the posture detecting device according to a first aspect of the present teaching which detects the tilt of the recording medium from the reference posture.

According to a third aspect of the present teaching, there is provided a lenticular sheet including: a lenticular lens having a plurality of convex lens parts in a semi-columnar shape arranged in parallel to one another;

an ink absorbing layer provided on a surface, of the lenticular lens, opposite the plural convex lens parts; and a detection target provided on the ink absorbing layer and detected by a detecting mechanism disposed in a recording apparatus, wherein the detection target includes:

a plurality of first detection targets each extending in an axial direction of the convex lens parts and arranged along a width direction of the convex lens parts perpendicular to the axial direction of the convex lens parts; and a plurality of second detection targets each extending in a width direction of the convex lens parts and arranged along the axial direction of the convex lens parts, and at least one of an arrangement interval of the detection target, a shape of the detection target, a material of the detection target, and an optical property of the detection target is different among the plurality of first detection targets and the plurality of second detection targets.

In the lenticular sheet of the present teaching, at least one of the arrangement interval, the shape, the material, and the optical property of the detection target is different between the first detection targets extending in the axial direction of the convex lens parts and arranged at equal intervals in the width direction of the convex lens parts and the second detection targets extending in the width direction of the convex lens parts and arranged at equal intervals in the axial direction of the convex lens parts. Therefore, from the detection result that the detecting mechanism provided in the recording apparatus obtains when it detects the detection target part while moving in the scanning direction relatively to the recording medium, it is possible to discriminate which of the detection targets are detected. For example, it is possible to discriminate to which of the axial direction and the width direction of the convex lens parts the scanning direction of the ink-jet head is parallel.

According to a fourth aspect of the present teaching, there is provided a method for detecting a posture of a medium, the method including:

preparing the medium having: a plurality of detection targets including a plurality of first detection targets each extending in a first direction and arranged at equal intervals in a second direction intersecting with the first direction at a predetermined angle; and a plurality of second detection targets each extending in the second direction and arranged at equal intervals in the first direction;

moving a detecting mechanism detecting the detection targets relatively to the recording medium in a scanning direction which is parallel to the second direction under a condition that the recording medium is set in a reference posture; and detecting a tilt of the recording medium from the reference posture, based on a detection result of the detection targets which is obtained by the detecting mechanism while moving in the scanning direction relatively to the recording medium.

When the medium is in the reference posture, the first detection targets arranged in the second direction are only detected at equal intervals by the detecting mechanism, but when the medium is tilted from the reference posture in the plane including the medium, the second detection targets are also detected in addition to the first detection targets detected at equal intervals. From such a difference in the detection results, it is possible to detect the tilt of the posture of the medium.

BRIEF DESCRIPTION OF THE DRAWINGS

FIG. 10 is a plane view of a lenticular sheet of another modified embodiment.

DETAILED DESCRIPTION OF THE PREFERRED EMBODIMENTS

Next, an embodiment of the present teaching will be explained. The ink-jet printer 1 is capable of recording a stereoscopic image on a lenticular sheet (see FIG. 2) having a plurality of convex lens parts arranged two-dimensionally, in addition to recording an image on an ordinary recording sheet.

Figure 1:
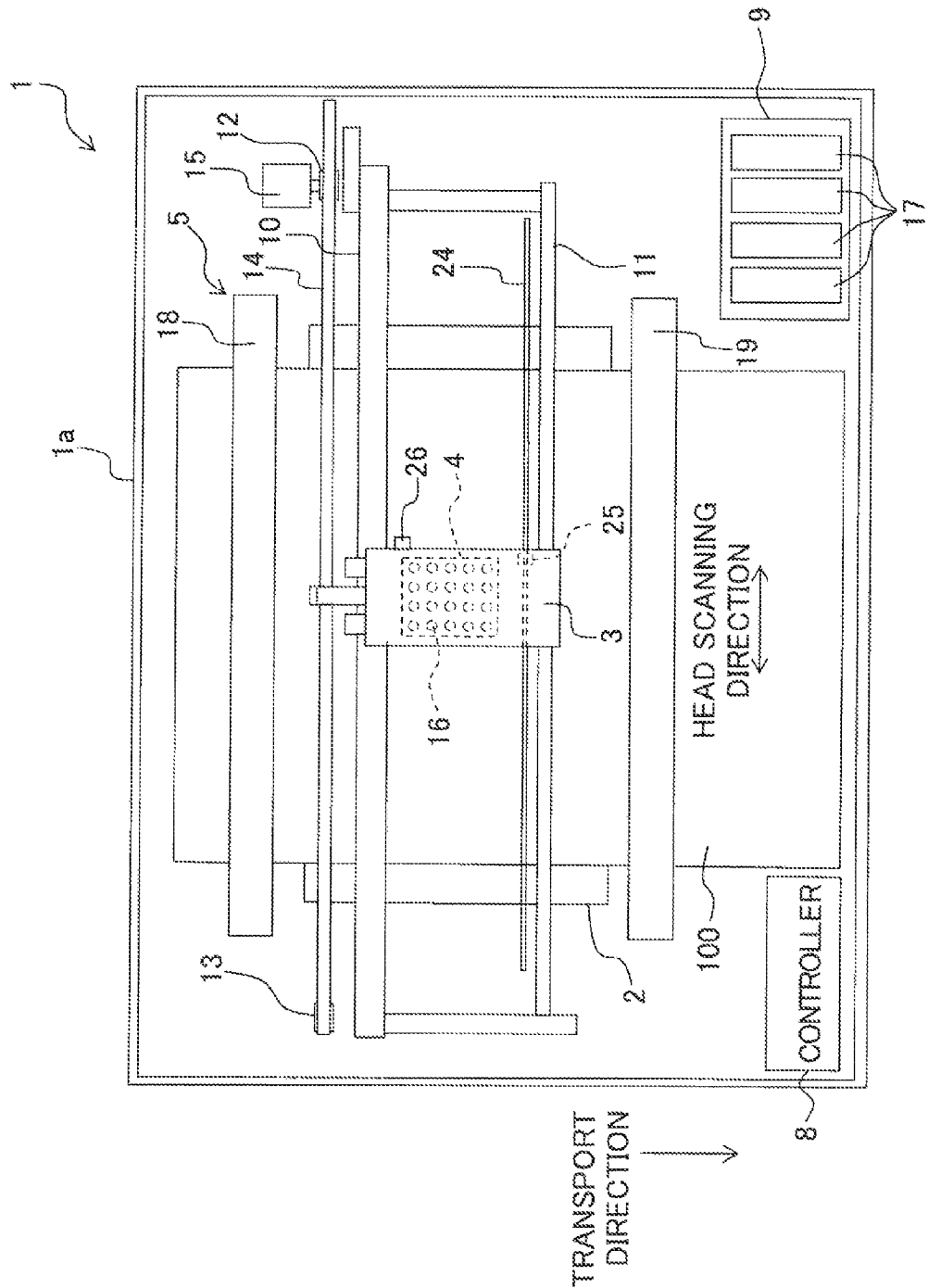
FIG. 1 is a schematic plane view of an ink-jet printer according to this embodiment.

First, the structure of a recording system including the ink jet printer 1 and the lenticular sheet 100 on which the ink-jet printer 1 records will be explained with reference to FIG. 1. As shown in FIG. 1, the ink-jet printer 1 includes: a platen 2 on which the lenticular sheet 100 is placed; a carriage 3 reciprocatable in a scanning direction parallel to the platen 2; an ink-jet head 4 mounted on the carriage 3; a transporting mechanism 5 transporting the lenticular sheet 100 in a transport direction perpendicular to the scanning direction; a controller 8 controlling the whole ink-jet printer 1, and so on.

On an upper surface of the platen 2, the lenticular sheet 100 (see FIG. 2) being a recording medium is placed, with its surface opposite a plurality of convex lens parts 31 being set on an upper side. Above the platen 2, two guide rails 10, 11 extending in parallel to a left and right direction in FIG. 1 (head scanning direction) are provided, and the carriage 3 is reciprocatable in the scanning direction along the two guide rails 10, 11 in a zone facing the platen 2. Further, an endless belt 14 wound between two pulleys 12, 13 is coupled to the carriage 3, and when the endless belt 14 is driven to run by a carriage driving motor 15, the carriage 3 moves in the scanning direction as the endless belt 14 runs.

In a printer body 1a of the printer 1, a linear encoder 24 having a large number of light-transmitting parts (slits) arranged at intervals in the scanning direction is provided. On the carriage 3, a head position detection sensor 25 including a transmissive optical sensor having a light-emitting element and a light-receiving element is provided. The printer 1 is capable of recognizing a current position of the carriage 3 (ink-jet head 4) in terms of the scanning direction, from a count value of the light-transmitting parts of the linear encoder 24 detected by the head position detection sensor 25 (the number of times they are detected) during the movement of the carriage 3.

Further, on a sidewall of the carriage 3, a sheet detection sensor 26 (detecting mechanism) detecting a plurality of detection target parts 36, 37 (to be described later) (see FIG. 4A and FIG. 4B) being slits of the lenticular sheet 100 is provided, and the sheet detection sensor 26 is movable as a unit with the carriage 3 in the head scanning direction (scanning direction in the present teaching). This sheet detection sensor 26 is a reflective photosensor having a light-emitting element emitting light to the lenticular sheet 100 and a light-receiving element receiving reflected light. Further, the sheet detection sensor 26 is provided at a position more on an upstream side in terms of the transport direction (upper side in FIG. 1) than nozzles 16 of an ink jet head 4 (to be described next). The sheet detection sensor 26 emits light to the lenticular sheet 100 while moving in the scanning direction with the carriage 3, and detects the detection target parts 36, 37 from a change in a light-receiving amount of the light-receiving element when the light is transmitted at the detection target parts 36, 37. A reason why the detection target parts 36, 37 are provided on the lenticular sheet 100, and so on will be explained later.

The ink-jet head 4 is installed on an underside of the carriage 3. A lower surface (a surface on a side across the paper in FIG. 1) of the ink-jet head 4 is disposed in parallel to the upper surface of the platen 2 and is a droplet jetting surface in which the plural nozzles 16 are opened. Further, as shown in FIG. 1, a holder 9 is fixed on the printer body 1a of the printer 1, and four ink cartridges 17 storing four color inks (black, yellow, cyan, magenta) respectively are installed in the holder 9. Further, the ink-jet head 4 mounted on the carriage 3 and the holder 9 are connected by four tubes (not shown), and the inks in the four ink cartridges 17 are supplied to the ink-jet head 4 via the four tubes respectively.

The ink-jet head 4 includes an actuator 27 (see FIG. 5) applying pressures to the respective inks in the nozzles 16 to cause the nozzles 16 to jet droplets of the inks independently. The actuator 27 is not limited to that of a specific driving type. For example, a well-known one such as a piezoelectric actuator utilizing piezoelectric distortion of a piezoelectric element is usable. The ink-jet head 4 uses the actuator 27 to make each of the nozzles 16 jet the corresponding color ink to the lenticular sheet 100 placed on the platen 2.

The transporting mechanism 5 has two transporting rollers 18, 19 arranged to sandwich the platen 2 in the transport direction. The two transporting rollers 18, 19 are each driven by a transporting motor 28 (see FIG. 5) and the lenticular sheet 100 placed on the platen 2 is transported in the transport direction (near side in FIG. 1) by the two transporting rollers 18, 19.

The ink-jet printer 1 jets the inks from the ink-jet head 4 reciprocating in the head scanning direction (the left and right direction in FIG. 1) with the carriage 3, to the lenticular sheet 100 placed on the platen 2 and transports the lenticular sheet 100 in the transport direction (toward the near side in FIG. 1) by the two transporting rollers 18, 19, to thereby print an image on the lenticular sheet 100.

Figure 2:
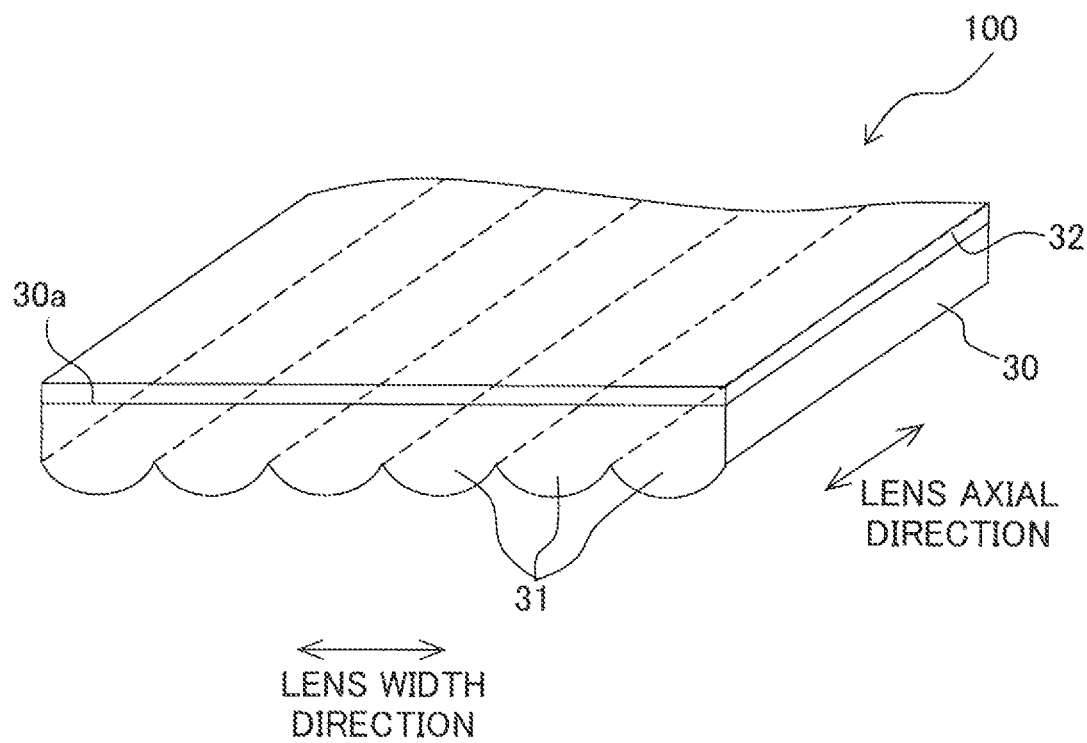
FIG. 2 is a perspective view of a lenticular sheet.

Next, the lenticular sheet 100 on which a stereoscopic image is recorded by the above-described ink jet printer 1 will be explained. As shown in FIG. 2, the lenticular sheet 100 has: a lenticular lens 30 having the convex lens parts 31 having a semi-columnar shape and arranged in their width direction so as to be parallel to one another; and an ink absorbing layer 32 disposed on a flat surface 30a, of the lenticular lens 30, opposite the convex lens parts 31.

The ink absorbing layer 32 is a colorless and transparent layer or a white layer excellent in ink absorbency. The ink absorbing layer 32 may be, for example, a resin layer excellent in ink absorbency containing a swelling material such as a water-absorbing polymer or a porous material such as a porous silica. Alternatively, it may be a paper sheet (recording sheet) used for ordinary image recording.

The ink absorbing layer 32 is divided into a plurality of regions as will be described later, and the ink jetted from the above-described ink-jet head 4 permeates in these regions to thereby form a plurality of pixel arrangement regions 35 on which a plurality of pixels are formed respectively. As shown in FIG. 3, in a region, of the ink absorbing layer 32, facing the single convex lens part 31, a left-eye pixel and a right-eye pixel which are slightly different so as to produce a binocular parallax operation are arranged in the width direction of the convex lens part 31 in the semi-columnar shape (hereinafter, referred to as a lens width direction). Incidentally, as shown in FIG. 4A as well, left-eye pixels and right-eye pixels are both arranged in rows in an axial direction of the convex lens parts 31 (hereinafter, referred to as a lens axial direction) perpendicular to the paper in FIG. 3.

Figure 3A:
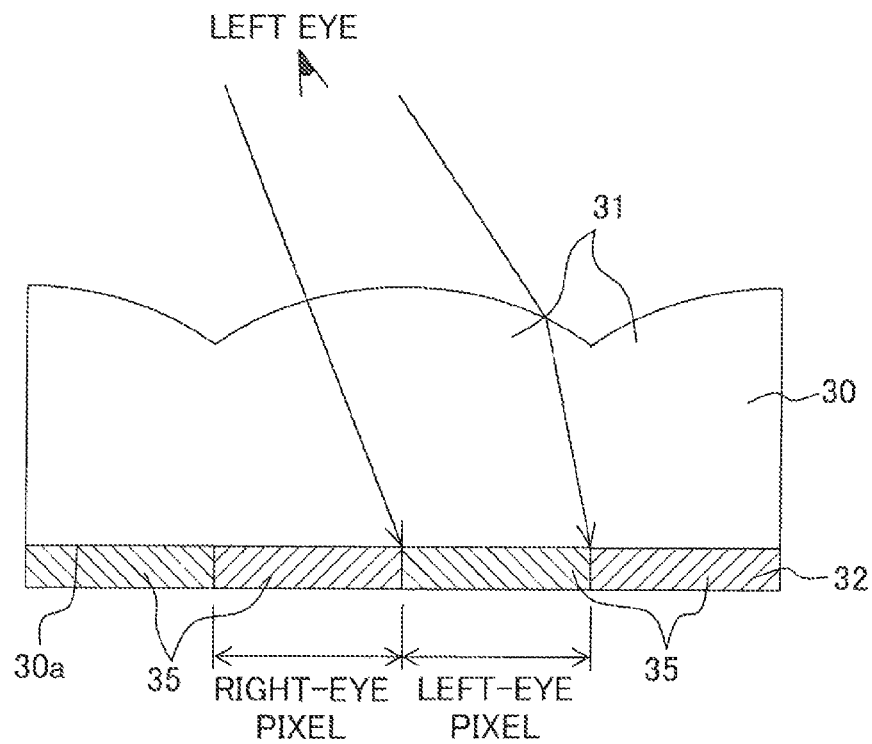
FIGS. 3A and 3B are views used to explain a stereoscopic visual effect by the lenticular sheet.
Figure 3B:
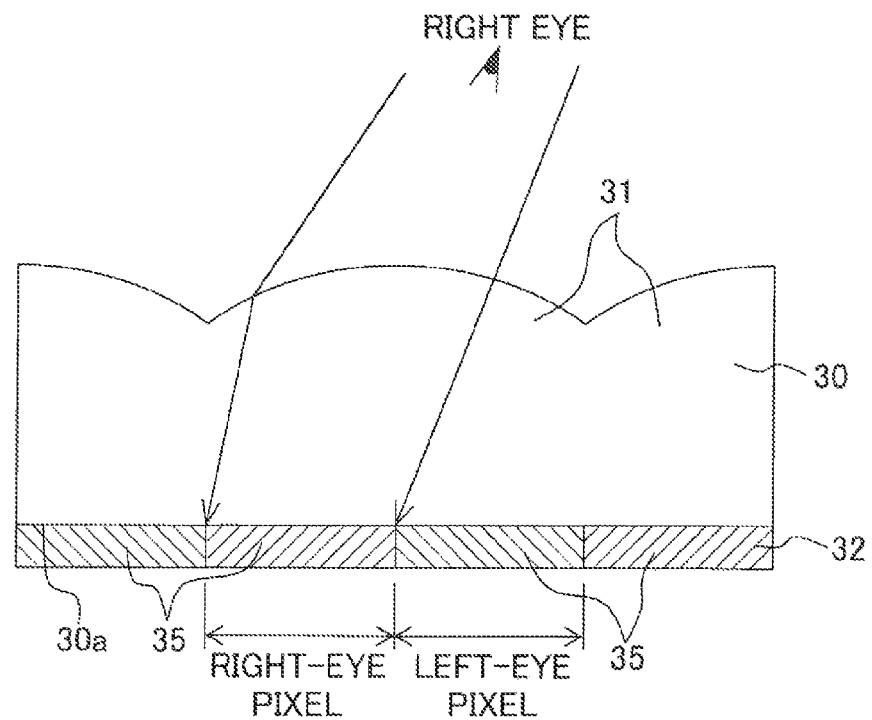

When, from the convex lens part 31 side of the lenticular lens 30, a person sees the lenticular sheet 100 in which the pixels (hatched portions) are formed on the respective pixel arrangement regions 35 of the ink absorbing layer 32, a visual field of the left eye becomes as in FIG. 3A due to a photorefractive effect of the convex lens parts 31. Therefore, the left eye visually perceives the left-eye pixels and does not visually perceive the right-eye pixels. On the other hand, a visual field of the right eye becomes as in FIG. 3B, and the right eye visually perceives the right-eye pixels and does not visually perceive the left-eye pixels. Thus, the use of the lenticular sheet 100 enables the left eye and the right eye to visually perceive the left-eye pixels and the right-eye pixels, respectively, which are slightly different pixels. As a result, a stereoscopic visual effect (stereoscopic visual sense) can be obtained.

Figure 4A:
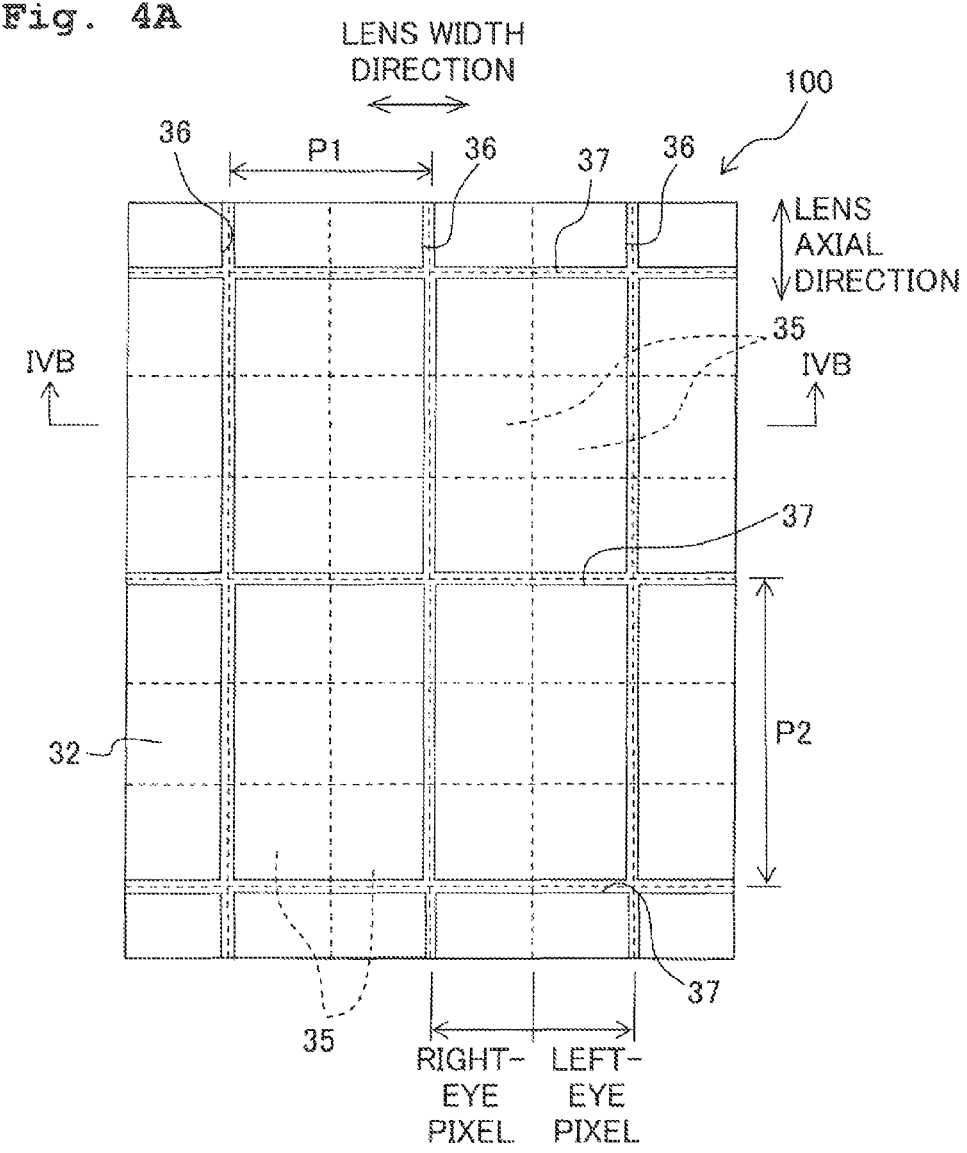
FIG. 4A is a fragmentary enlarged plane view of the lenticular sheet seen from an ink absorbing layer side.

As shown in FIG. 4A, the ink absorbing layer 32 is divided into a plurality of regions by vertical and lateral virtual boundaries (broken lines in FIG. 4A) perpendicular to one another. The regions each correspond to the single pixel arrangement region 35. As shown in FIG. 4A, the ink absorbing layer 32 is divided into the regions so that the pixel arrangement region 35 for one left-eye pixel and the pixel arrangement region 35 for one right-eye pixel are arranged in the lens width direction for one convex lens part 31. Consequently, the pixel arrangement regions 35 for the left-eye pixels and the pixel arrangement regions 35 for the right-eye pixels are both arranged in rows in the lens axial direction.

Figure 4B:
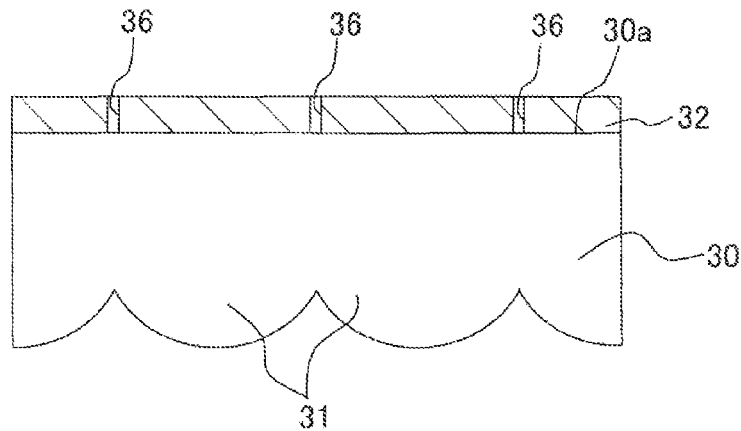
FIG. 4B is a cross-sectional view taken along B-B line in FIG. 4A.

As shown in FIGS. 4A and 4B, a plurality of first detection target parts 36 and a plurality of second detection target parts 37 both formed as slits penetrating through the ink absorbing layer 32 and perpendicular to each other in a plane view are formed in the ink absorbing layer 32. In more detail, the first detection target parts 36 each extend in the lens axial direction (first direction) and are arranged at equal intervals at a predetermined pitch P1 in the lens width direction (second direction). Further, the second detection target parts 37 each extend in the lens width direction and are arranged at equal intervals at a predetermined pitch P2 in the lens axial direction.

Further, the arrangement pitch P1 of the first detection target parts 36 and the arrangement pitch P2 of the second detection target parts 37 are different. In this embodiment, as shown in FIG. 4B, the first detection target parts 36 are each provided at a position between the two adjacent convex lens parts 31. Since the pixel arrangement region 35 for the left-eye pixel and the pixel arrangement region 35 for the right-eye pixel are arranged in the lens width direction as described above, the first detection target parts 36 are arranged in the lens width direction for every two pixels (pixel arrangement regions 35). On the other hand, the second detection target parts 37 are arranged in the lens axial direction for every three pixels (pixel arrangement regions 35). That is, the arrangement pitch P2 of the second detection target parts 37 is 1.5 times the arrangement pitch P1 of the first detection target parts 36.

Further, the first detection target parts 36 and the second detection target parts 37 are the slits penetrating through the ink absorbing layer 32 in a thickness direction, and at positions where the first detection target parts 36 and the second detection target parts 37 are formed, a quantity of light transmitted to the lenticular lens 30 side (light transmission quantity), out of light emitted from a surface of the ink absorbing layer 32, increases compared with a light transmission quantity at other positions. Therefore, it is possible to detect the first detection target parts 36 and the second detection target parts 37 by the optical sheet detection sensor 26 (see FIG. 1) moving with the carriage 3, of the ink jet printer 1. As will be described later, the printer 1 is capable of determining a posture (feed direction) of the lenticular sheet 100 transported on the platen 2 and detecting its tilt in the plane including the lenticular sheet 100, based on the detection result of the first detection target parts 36 and the second detection target parts 37 detected by the sheet detection sensor 26.

Figure 5:
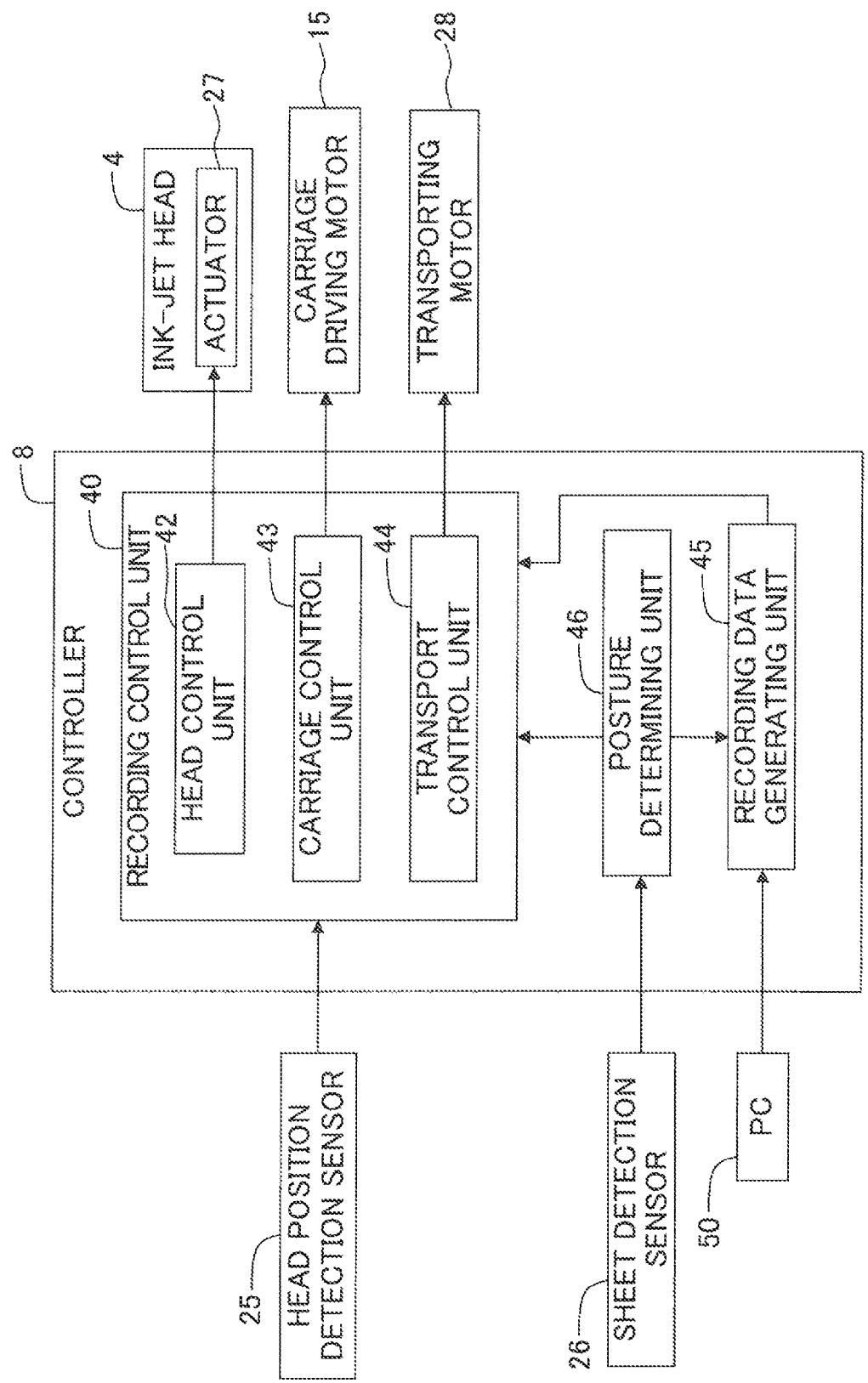
FIG. 5 is a block diagram schematically showing an electric structure of a printer.

Next, an electric structure of the ink-jet printer 1 will be explained, focusing on the controller 8, with reference to the block diagram in FIG. 5. The controller 8 includes a microcomputer including, for example: a Central Processing Unit (CPU); a Read Only Memory (ROM) storing various kinds of programs for controlling the whole operation of the printer 1, data, and so on; a Random Access Memory (RAM) temporarily storing data and so on processed by the CPU; and so on, and when the programs stored in the ROM are executed by the CPU, the controller 8 performs various controls regarding image recording and so on as will be explained below. Alternatively, the controller 8 may be a hardware controller in which various kinds of circuits including an arithmetic circuit are combined.

The controller 8 has a recording control unit 40 including: a head control unit 42 controlling the actuator 27 of the ink-jet head 4; a carriage control unit 43 controlling the carriage driving motor 15 driving the carriage 3 in the head scanning direction; and a transport control unit 44 controlling the transporting motor 28 driving the transporting rollers 18, 19. The controller 8 further includes a recording data generating unit 45 which, from image data input from a PC 50 being an external apparatus, generates recording data containing information regarding position, color, density, or the like of each of the pixels that are to be formed on the lenticular sheet 100. The recording control unit 40 controls the actuator 27 of the ink-jet head 4, the carriage driving motor 15, and the transporting motor 28 of the transporting mechanism 5 based on the recording data generated by the recording data generating unit 45, to cause the recording on the lenticular sheet 100.

The controller 8 further includes a posture determining unit 46 (posture determining mechanism) determining a posture of the lenticular sheet 100 transported by the transporting mechanism 5, based on the detection result of two kinds of the detection target parts 36, 37 of the lenticular sheet 100 by the sheet detection sensor 26. Here, to determine the posture of the lenticular sheet 100 means to determine whether the lens axial direction of the lenticular sheet 100 is parallel to or perpendicular to the transport direction. Hereinafter, the posture determination of the lenticular sheet 100 by the posture determining unit 46 will be explained in detail.

<Determination of Feed Direction of Sheet>

The posture determining unit 46 discriminates and determines whether the posture (feed direction) of the lenticular sheet 100 when it is transported is a posture where the lens width direction is parallel to the head scanning direction (first posture) or a posture where the lens axial direction is parallel to the head scanning direction, that is, a posture rotated by 90 degrees from the first posture in the plane including the lenticular sheet 100 (second posture).

As shown in FIG. 1, the sheet detection sensor 26 for detecting the posture of the lenticular sheet 100 is on the upstream side of the nozzles 16 of the ink-jet head 4 in terms of the transport direction. Therefore, when the lenticular sheet 100 is transported, the sheet detection sensor 26 first detects two kinds of the detection target parts 36, 37 and the posture determining unit 46 determines the posture of the lenticular sheet 100 based on the detection result. Then, after the posture determination, it is possible to transport the lenticular sheet 100 as it is to a zone facing the nozzles 16 of the ink-jet head 4 (printing zone) to continue the image recording without returning the lenticular sheet 100 backward.

As shown in FIG. 3, the left-eye pixels and the right-eye pixels are arranged adjacent to each other in the lens width direction. If the positions of the left-eye pixels and the right-eye pixels in terms of the lens width direction deviate when the pixels are formed on the ink absorbing layer 32 by the ink-jet head 4, it might not be possible to produce the binocular parallax for realizing a stereoscopic image. Therefore, landing accuracy in the lens width direction is preferably increased. In order to increase landing accuracy in the lens width direction, it is important to determine whether the head scanning direction is parallel to the lens axial direction or is parallel to the lens width direction.

Figure 6A:
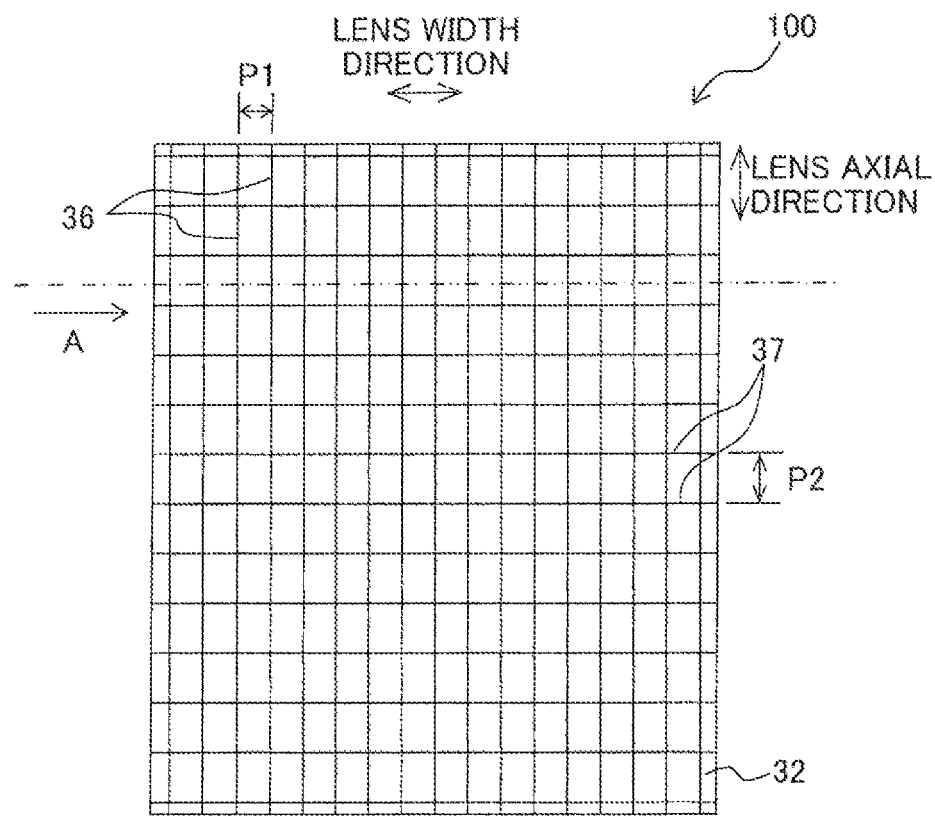
FIG. 6A is a plane view of the lenticular sheet in a first posture.
Figure 6B:
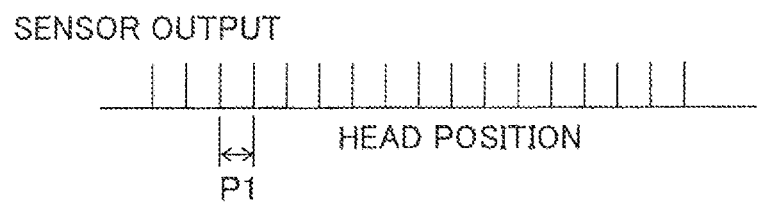
FIG. 6B shows a sensor output waveform in the state in FIG. 6A.

When the lens width direction of the lenticular sheet 100 is parallel to the head scanning direction (first posture) as shown in FIG. 6A, the sheet detection sensor 26 moves in the head scanning direction shown by the arrow A along the two-dot chain line in FIG. 6A. As the sheet detection sensor 26 moves, light emitted from the light-emitting element of the sheet detection sensor 26 is transmitted through the ink absorbing layer 32 at the positions of the first detection target parts 36. Therefore, since a sensor output (light-receiving amount of the light-receiving element) changes at the positions of the first detection target parts 36 as shown in FIG. 6B, the first detection target parts 36 arranged at the pitch P1 are detected. Actually, since a time-dependent change of the light-receiving amount by the light-receiving element is output from the sheet detection sensor 26, strictly speaking, the horizontal axis in FIG. 6B should be "time", but here, for convenience of explanation, in consideration of position information of the ink-jet head 4 obtained by the head position detection sensor 25, the horizontal axis is shown as the position of the head 4 when the light is transmitted through the first detection target parts 36 being the slits.

Figure 7A:
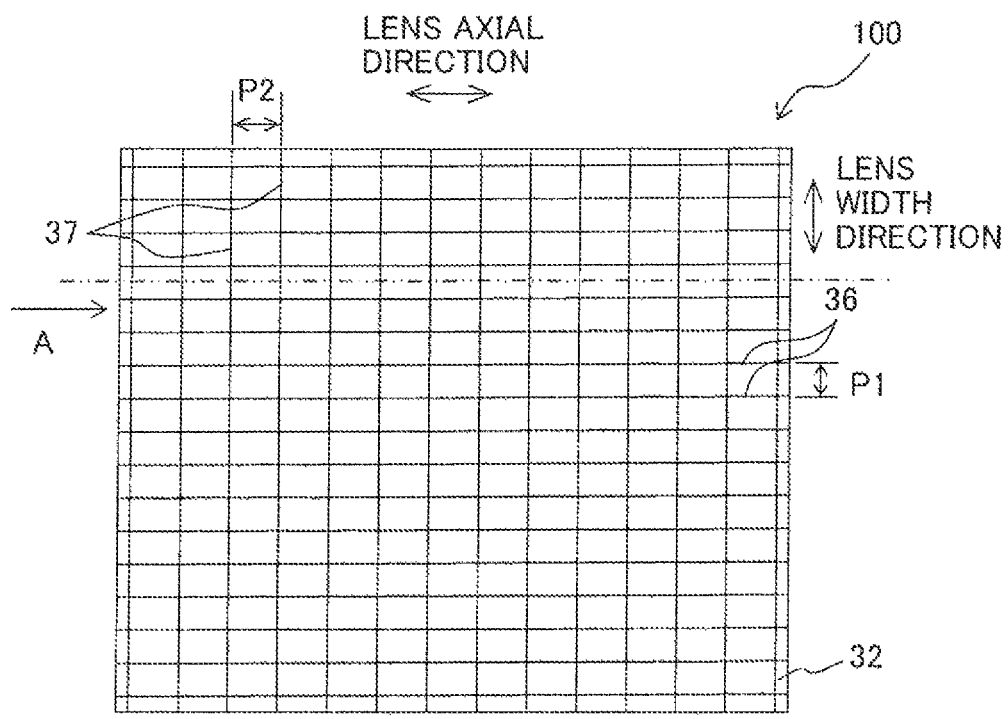
FIG. 7A is a plane view of the lenticular sheet in a second posture.
Figure 7B:
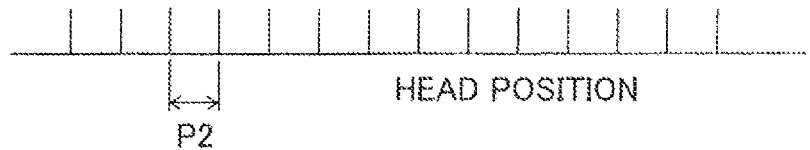
FIG. 7B shows a sensor output waveform in the state in FIG. 7A.

When the lens axial direction of the lenticular sheet 100 is parallel to the head scanning direction (second posture) as shown in FIG. 7A, light emitted from the light-emitting element of the sheet detection sensor 26 moving in the head scanning direction is transmitted through the ink absorbing layer 32 at the positions of the second detection target parts 37. Therefore, since a sensor output changes at the positions of the second detection target parts 37 as shown in FIG. 7B, the second detection target parts 37 arranged at the pitch 2 are detected. When the sheet detection sensor 26 happens to be located directly above the first detection targets parts 36 or the second detection target parts 37 extending in the scanning direction, a continuous sensor output is obtained instead of the intermittent sensor output shown in FIG. 6B or FIG. 7B. In such a case, by moving the lenticular sheet 100 in the transport direction, it is possible to eliminate the state where the sheet detection sensor 26 is located directly above the first detection target parts 36 or the second detection target parts 37 extending in the scanning direction, so that the intermittent sensor output shown in FIG. 6B or FIG. 7B can be obtained.

Then, the posture determining unit 46 determines whether the direction of the lenticular sheet 100 is the first posture or the second posture based on whether the sheet detection sensor 26 detects the first detection target parts 36 or the second detection target parts 37. Further, according to the posture of the lenticular sheet 100 determined by the posture determining unit 46, the recording data generating unit 45 generates recording data from image data input from the PC 50. Then, based on the recording data corresponding to the posture of the lenticular sheet 100, the recording control unit 40 controls an image recording operation to the lenticular sheet 100 by the carriage 3 and the ink-jet head 4.

Here, when the lenticular sheet 100 is in the first posture where the lens width direction is parallel to the head scanning direction of the ink jet head 4, the pixel arrangement regions 35 for the left-eye pixels and the pixel arrangement regions 35 for the right-eye pixels are arranged adjacently to each other in the head scanning direction as shown in FIG. 4A and FIG. 4B. Therefore, when there occurs deviation in the ink landing positions in the head scanning direction, quality of the stereoscopic image greatly lowers. On the other hand, when the lenticular sheet 100 is in the second posture, the pixel arrangement regions 35 for the left-eye pixels and the pixel arrangement regions 35 for the right-eye pixels are both arranged in rows in the head scanning direction. The deviation in the ink landing positions between the pixels of the same kind (between the left-eye pixels or between the right-pixels) does not greatly affect the quality of the stereoscopic image. Therefore, when the posture determining unit 46 determines that the posture of the lenticular sheet 100 is the first posture, a scanning speed of the carriage 3 (ink-jet head 4) during the image recording may be made lower than that when the posture is determined as the second posture. This can prevent the deviation in the ink landing positions in the head scanning direction.

<Determination of Tilt>

Further, the posture determining unit 46 detects a tilt (rotation) of the lenticular sheet 100 from the aforesaid first posture or second posture in the plane parallel to the lenticular sheet 100.

Figure 8A:
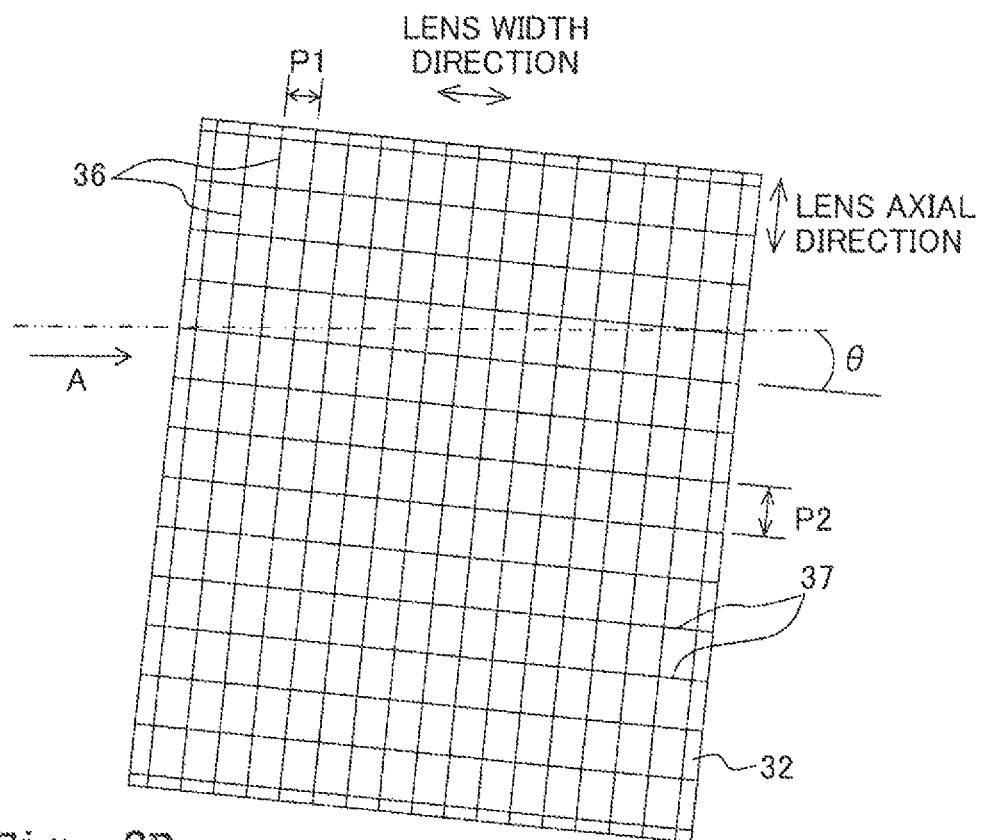
FIG. 8A is a plane view of the lenticular sheet when it is tilted slightly from the first posture in a clockwise direction.
Figure 8B:
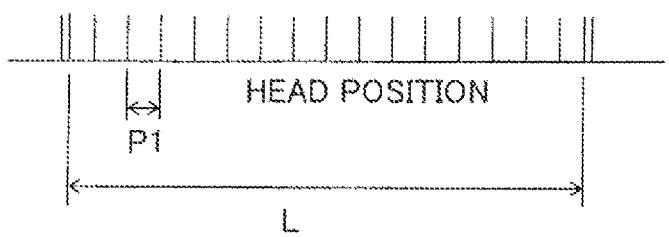
FIG. 8B shows a sensor output waveform in the state in FIG. 8A.

Assuming that, as shown in FIG. 8A, the carriage 3 is moved in the head scanning direction as shown by the arrow A in the state where the lenticular sheet 100 is slightly tilted in a clockwise direction from the state of the first posture, at this time, the head scanning direction and the lens width direction being the extension direction of the second detection target parts 37 are not parallel to each other but intersect with each other. Therefore, the sheet detection sensor 26 detects not only the first detection target parts 36 at equal intervals but also some of the second detection target parts 37 as shown in FIG. 8B. Therefore, from a ratio of the arrangement pitch P2 of the second detection target parts 37 to a detection interval L of the second detection target parts 37 in the head scanning direction (P2/L), it is possible to find the tilt of the lenticular sheet 100 from the first posture ($\sin \theta = P2/L$).

Here, as is apparent from the above expression, for the calculation of the tilt ($\sin \theta$), it is necessary that the controller 8 of the printer 1 knows the arrangement pitch P2 of the second detection target parts 37 in advance. The controller 8 can get the knowledge about the arrangement pitch P2 by the following methods, for instance.

For example, the lenticular sheet 100 is transported in the transport direction by the transporting rollers 18, 19 in the state shown in FIG. 1 where the carriage 3 is stopping at such a position that the sheet detection sensor 26 faces the lenticular sheet 100. At this time, the sheet detection sensor 26 located on the upstream side of the nozzles 16 in terms of the transport direction detects the second detection target parts 37 extending in the head scanning direction, until a leading end of the lenticular sheet 100 reaches the printing zone. Therefore, it is possible to calculate the arrangement pitch P2 of the second detection target parts 27 from a transport amount of the lenticular sheet 100 when the sheet detection sensor 26 detects the second detection target parts 37 a predetermined number of times. Alternatively, the arrangement pitch P2 of the second detection target parts 37 of the lenticular sheet 100 together with image data may be transmitted from the PC 50 side. Alternatively, the arrangement pitch P2 may be input by a user when the tilt is detected.

Further, when the lenticular sheet 100 is slightly tilted from the second posture, the tilt of the lenticular sheet 100 from the second posture is found from a detection interval of the first detection target parts 36 in the head scanning direction and the arrangement pitch P1 of these first detection target parts 36, conversely to the above.

Strictly speaking, the detection interval of the detection target parts 36 (37) that are detected at equal intervals when the lenticular sheet 100 tilts differs slightly from the arrangement pitch P1 (P2) thereof, but it is assumed here that the tilt of the lenticular sheet 100 from the first posture (second posture) is small, and the difference in the aforesaid detection interval depending on the presence/absence of the tilt is also small. Therefore, it can be easily discriminated whether the detection target parts detected at equal intervals at the time of the tilt detection are the first detection target parts 36 or the second detection target parts 37 (that is, whether the reference posture which is a basis of the tilt detection is the first posture or the second posture).

As described above, when the lenticular sheet 100 is tilted from the first posture or the second posture, some of the second detection target parts 37 are detected while the first detection target parts 36 are detected at equal intervals, or conversely, some of the first detection target parts 36 are detected while the second detection target parts 37 are detected at equal intervals. Therefore, from the detection result of the sheet detection sensor 26, it is possible to determine the tilt of the lenticular sheet 100.

When the posture determining unit 46 detects the tilt of the lenticular sheet 100 from the first posture or the second posture, the recording data generating unit 45 rotates and converts recording data (position data of the plural pixels) that should have been generated if there were no tilt, by the aforesaid tilt, thereby changing the recording data. That is, the recording data generating unit 45 corresponds to a data changing mechanism of the present teaching. Then, the recording control unit 40 controls the image recording to the lenticular sheet 100 based on the recording data generated according to the tilt of the lenticular sheet 100. Consequently, even when the lenticular sheet 100 is tilted, changing the recording data according to its tilt enables the normal recording to the lenticular sheet 100.

Incidentally, when a tilt angle $\theta$ of the lenticular sheet 100 has a small influence on image quality or is equal to or less than a permissible value, the aforesaid rotation and conversion of the recording data is not necessary. Hereinafter, an example of the aforesaid permissible value will be shown.

Under the following condition, the permissible value of the tilt angle is about 0.1 degree.

sheet width of the lenticular sheet 100: 210 mm width of one pixel of the lenticular lens 30: 0.127 mm permissible distance of landing position deviation: 0.381 mm (a case where the landing position deviates in the lens axial direction by three pixels)

Therefore, the arrangement pitch P2 of the second detection target parts 37 is desirably set to such an interval that they can be detected by the sheet detection sensor 26 at least when one-degree tilt occurs. If the arrangement pitch P2 of the second detection target parts 37 is too large, only the first detection target parts 36 are detected at the time of the tilt detection.

On the other hand, when the tilt detected by the posture determining unit 46 is too large, it is not sometimes possible to form an image on the lenticular sheet 100. For example, it can be conceivable that, when the recording data is rotated according to the tilt, a moving range of the carriage 3 in the scanning direction necessary for recording such an image becomes large to exceed its movable range. Therefore, when the tilt detected by the posture determining unit 46 is equal to or larger than a predetermined value, it is determined that the accurate image formation on the lenticular sheet 100 is not possible, and an error message is displayed on an external apparatus such as the PC 50 or a liquid crystal panel (not shown) of the printer 1.

Next, modification embodiments in which various changes are made to the above-described embodiment will be explained. Note that those having the same structures as those of the above-described embodiment will be denoted by the same reference numerals and symbols and a description thereof will be omitted when appropriate.

First Modified Embodiment

The structures of the detection target parts 36, 37 provided on the lenticular sheet 100 and the sheet detection sensor 26 detecting these detection target parts 36, 37 are not limited to those in the above-described embodiment.

For example, the first detection target parts 36 (second detection target parts 37) arranged at a predetermined pitch may be formed on the ink absorbing layer 32 by using a material different from that of the ink absorbing layer 32. When the first detection target parts 36 and the second detection target parts 37 are made of a material different in optical property (light transmitting property, light reflectivity, or the like) from the ink absorbing layer 32, the optical sheet detection sensor 26 of the printer 1 can detect them. Alternatively, when the detection target parts are made of a magnetic material, it is possible to detect them by forming the sheet detection sensor 26 as a magnetic sensor. Further, when the detection target parts are made of a metal material, it is possible to detect them by forming the sheet detection sensor 26 as a proximity sensor detecting an eddy current generated when the sensor is in proximity with the detection target parts 36, 37. Further, the first detection target parts 36 (second detection target parts 37) may be formed on a flat surface, of the ink absorbing layer 32, opposite the lenticular lens 30. Alternatively, the first detection target parts 36 (second detection target parts 37) may be projecting parts formed integrally on the flat surface 30a of the lenticular lens 30 and penetrating through and projecting from the ink absorbing layer 32. In the above-described explanation, the first detection target parts 36 (second detection target parts 37) are formed as the slits penetrating through the ink absorbing layer 32. In other words, the first detection target parts 36 (second detection target parts 37) continuously extend in a predetermined direction. However, the present teaching is not necessarily limited to such a structure, and the first detection target parts 36 (second detection target parts 37) do not necessarily have to be formed to continuously extend, provided that they are arranged to extend in a predetermined direction. For example, the first detection target parts 36 (second detection target parts 37) may be a plurality of through holes arranged in a predetermined direction and penetrating through the ink absorbing layer 32.

Second Modified Embodiment

Figure 9:
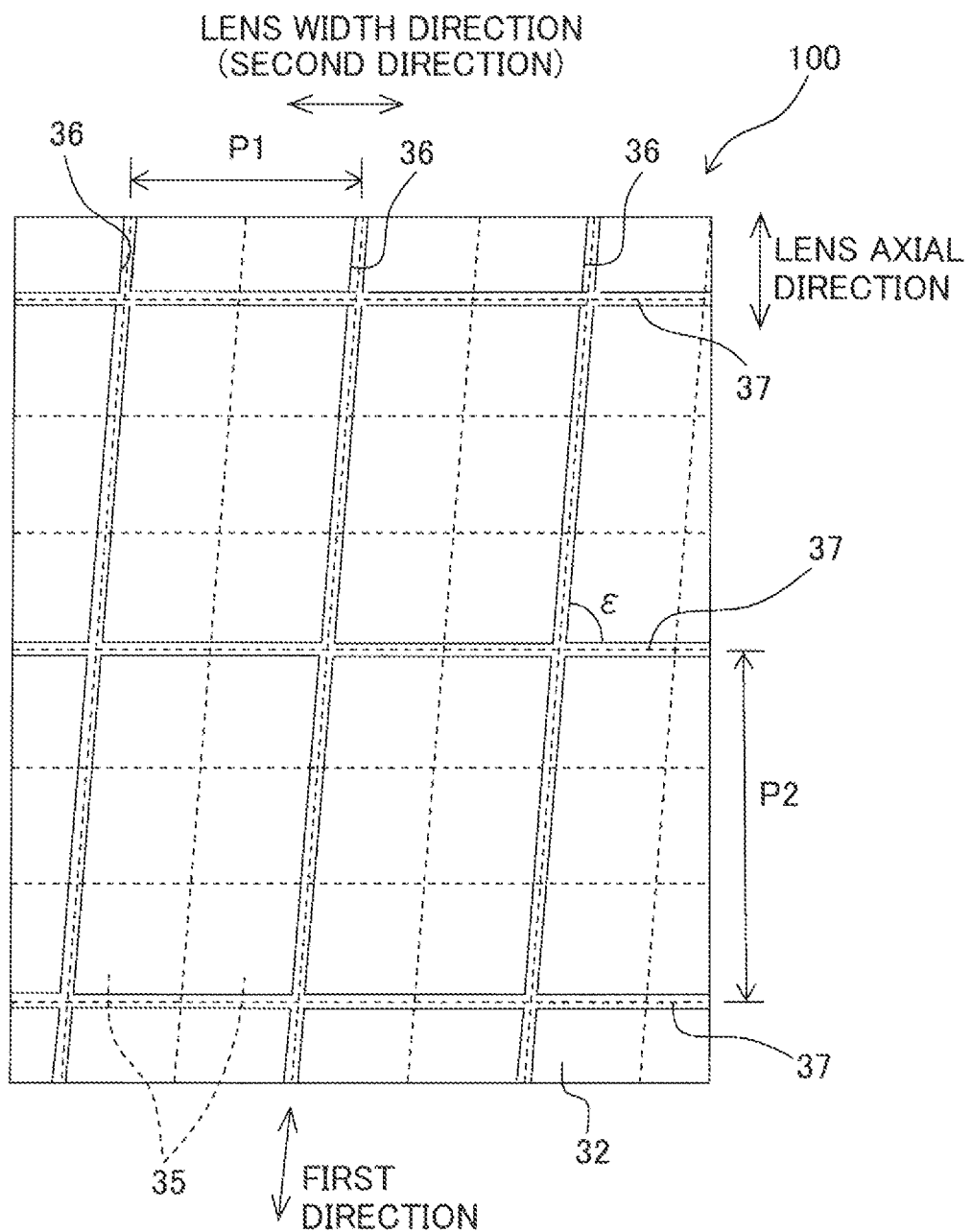
FIG. 9 is a plane view of a lenticular sheet of a modified embodiment.

The extension direction of the first detection target parts 36 and the extension direction of the second detection target parts 37 need not be perpendicular to each other, and may intersect with each other at an angle ϵ different from 90 degrees as shown in FIG. 9. In this case, assuming that the head, scanning direction is the left and right direction in FIG. 9, the first posture detected by the posture determining unit 46 is such a posture that a direction being the arrangement direction of the first detection target parts 36 and being the extension direction of the second detection target parts 37 (second direction) is parallel to the head scanning direction as shown in FIG. 9. Further, the second posture is such a posture that a direction being the extension direction of the first detection target parts 36 and being the arrangement direction of the second detection target parts 37 (first direction) is parallel to the head scanning direction, that is, a posture rotated from the posture in FIG. 9 in a plane parallel to the paper by the angle ϵ.

Third Modified Embodiment

As shown in FIG. 10, the pitch P1 of the first detection target parts 36 and the pitch P2 of the second detection target parts 37 may be equal to each other. In this case as well, by making the shape, the material, or the like different between the first detection target parts 36 and the second detection target parts 37, it is possible to discriminate the first detection target parts 36 and the second detection target parts 37, so that the feed direction of the lenticular sheet 100 can be detected. For example, when the sheet detection sensor 26 detecting the detection target parts 36, 37 is an optical sensor as in the above-described embodiment, the detection is possible by making the width or the number of the detection target parts different between the first detection target parts 36 and the second detection target parts 37, or by making the optical property (light transmittance or reflectivity) different therebetween by making a surface quality (for example, color) or a surface shape (for example, surface roughness) of the detection target parts different therebetween. With such a structure, the sensor output waveforms when the first detection target parts 36 are detected and when the second detection target parts 37 are detected become different from each other, which makes it possible to discriminate whether the detected detection target parts are the first detection target parts 36 or the second detection target parts 37. Incidentally, two items or more of the aforesaid arrangement interval, number, shape, material, and so on may be made different between the first detection target parts 36 and the second detection target parts 37, instead of making only one item different.

Further, in some case, it is not necessary to discriminate the first detection target parts 36 and the second detection target parts 37 at the time of the detection. For example, when the printer 1 is structured such that the lenticular sheet 100 is constantly transported in one of the first posture and the second posture, and when a transport posture (the first posture or the second posture) of the lenticular sheet 100 is input from an external apparatus such as the PC 50 in advance, the printer 1 need not go so far as to detect the feed direction of the lenticular sheet 100, but only need to detect the tilt from such a predetermined posture. When there is no need to discriminate the first detection target parts 36 and the second detection target parts 37 at the time of the detection as described above, there is no special need to make the arrangement interval, the shape, or the like different between the first detection target parts 36 and the second detection target parts 37.

Fourth Modified Embodiment

At least the first detection target parts 36 may be made of a material lower in ink permeability than the ink absorbing layer 32 and they may be each provided in each gap between the pixel arrangement regions 35 of the ink absorbing layer 32 in the lens width direction. In this case, the first detection target parts 36 function as a suppressing layer suppressing the permeation of the ink, so that the ink is prevented from running to/from the pixels adjacent in the lens width direction (the left-eye pixel and the right-eye pixel). Further, by the sheet detection sensor 26 detecting the first detection target parts 36 provided for the respective pixel arrangement regions 35 when the lenticular sheet 100 is in the first posture where the lens width direction and the head scanning direction are parallel to each other, it is possible to know the position of the pixel arrangement regions 35 in terms of the head scanning direction, which enables the accurate landing of the ink on the pixel arrangement regions 35. Incidentally, the second detection target parts 37 each may also be provided in each gap between the pixel arrangement regions 35 of the ink absorbing layer 32 in the lens axial direction.

Fifth Modified Embodiment

In the above-described embodiment, the sheet detection sensor 26 detecting the detection target parts 36, 37 of the lenticular sheet 100 moves with the carriage 3 in the head scanning direction relatively to the lenticular sheet 100, but the sensor 26 may be structured to independently move in the head scanning direction. Alternatively, instead of moving the sensor 26, the lenticular sheet 100 may be moved relatively to the sensor 26.

Sixth Modified Embodiment

In the above-described embodiment, the sheet detection sensor 26 is moved in the head scanning direction relatively to the lenticular sheet 100, but it is also possible to detect the posture of the lenticular sheet 100 by moving the sheet detection sensor 26 in the transport direction relatively to the lenticular sheet 100. In this case, the transport direction corresponds to the "scanning direction" of the present teaching which is a movement direction of the sheet detection sensor 26 relative to the lenticular sheet 100. For example, in FIG. 8A, when the lenticular sheet 100 is transported to a downstream side (downward in FIG. 8) in the transport direction in the state where the sheet detection sensor 26 is stopped (its position is fixed), the sensor 26 detects the detection target parts 37 extending in the lens width direction at equal intervals and also detects some of the detection target parts 36 extending in the lens axial direction.

Seventh Modified Embodiment

The present teaching is also applicable to a recording medium other than the lenticular sheet. For example, when an image is recorded on an ordinary rectangular paper sheet (recording sheet), it is also important to know whether the feed direction of the recording sheet is a short-edge feed direction or a long-edge feed direction and to detect the tilt from a predetermined posture (the short-edge feed direction or the long-edge feed posture). Providing two kinds of detection target parts on such a recording sheet and detecting them by a detecting mechanism provided in a recording apparatus, it is well possible to detect the direction and the tilt as in the case of the lenticular sheet.

Further, the recording apparatus recording an image on a recording medium is applicable not only to the ink-jet printer of the above-described embodiment but also to a printer of other recording type such as a laser printer.

Eighth Modified Embodiment

The method of detecting the posture of the medium or the posture detecting device according to the present teaching does not necessarily have to be used in the recording apparatus recording an image on a recording medium such as a lenticular sheet. The present teaching is applicable to a posture detecting device (posture detecting method) detecting a tilt (tilt amount) of a medium set in a predetermined posture, from a reference posture (posture that should be taken). For example, the present teaching is usable as a posture detecting device (posture detecting method) detecting a tilt (posture) of a medium transported in a cutting machine or the like that cuts the medium such as a lenticular sheet or a long recording sheet into a predetermined length while transporting the medium in a predetermined direction.

What is claimed is:

1. A posture detecting device which detects a tilt from a reference posture, of a medium on which a detection target is provided, the apparatus comprising:
   a detecting mechanism which is movable in a scanning direction relatively to the medium to detect the detection target; and
   a posture determining mechanism which determines the tilt of the medium from the reference posture based on a detection result of the detection target, the detection result being obtained by the detecting mechanism while moving in the scanning direction relatively to the medium before recording on the medium;
   wherein as the detection target detected by the detecting mechanism, the medium has:
   a plurality of first detection targets each extending in an intersecting direction intersecting with the scanning direction at a predetermined angle and arranged at equal intervals in the scanning direction; and
   a plurality of second detection targets each extending in the scanning direction and arranged at equal intervals in the intersecting direction, under a condition that the medium is in the reference posture.

2. The posture detecting device according to claim 1;
   wherein the posture determining mechanism determines the tilt of the medium from the reference posture based on a time difference between times when the detecting mechanism detects two of the second detection targets while moving in the scanning direction relatively to the medium, and based on an interval of the two second detection targets in the intersecting direction.

3. The posture detecting device according to claim 1;
   wherein the detecting mechanism is movable in the scanning direction relatively to the medium at a constant scanning speed, and
   wherein the posture determining mechanism determines the tilt of the medium from the reference posture based on a ratio of an interval of the two second detection targets in the scanning direction, which is calculated from a product of the time difference and the scanning speed, and an interval between the two second detection targets in the intersecting direction.

4. The posture detecting device according to claim 1;
wherein the first detection targets and the second detection targets are discriminatingly detected by the detecting mechanism; and
wherein, based on the detection result of the detection targets by the detecting mechanism, the posture determining mechanism determines whether the medium is in a first posture where the arrangement direction of the plurality of first detection targets and the extension direction of the plurality of second detection targets are parallel to the scanning direction, or in a second posture where the extension direction of the plurality of first detection targets and the arrangement direction of the plurality of second detection targets are parallel to the scanning direction.

5. The posture detecting device according to claim 4;
wherein, under a condition that the detection targets detected by the detecting mechanism while moving in the scanning direction relatively to the medium are the first detection targets, the posture determining mechanism determines that the medium is in the first posture; and
wherein, under a condition that the detection targets detected by the detecting mechanism while moving in the scanning direction relatively to the medium are the second detection targets, the posture determining mechanism determines that the medium is in the second posture.

6. A recording apparatus which performs recording on a medium as a recording medium, the apparatus comprising:
a recording head which performs recording on the recording medium while moving relatively to the recording medium;
a controller which controls the recording head; and
the posture detecting device according to claim 1 which detects the tilt of the recording medium from the reference posture.

7. The recording apparatus according to claim 6, further comprising:
a data changing mechanism;
wherein, under a condition that the posture detecting device detects that the recording medium is tilted from the reference posture, the data changing mechanism changes recording data that is to be recorded on the recording medium, according to the tilt.

8. The recording apparatus according to claim 6;
wherein the recording head is an ink-jet head jetting an ink droplet from a nozzle while moving in the scanning direction relatively to the recording medium;
wherein the recording medium is a lenticular sheet having:
a lenticular lens having a plurality of convex lens parts in a semi-columnar shape arranged in parallel to one another; and
an ink absorbing layer provided on a surface, of the lenticular lens, opposite the convex lens parts;
wherein a plurality of first detection targets and a plurality of second detection targets are provided on the ink absorbing layer;
wherein each of the first detection targets extends in an axial direction of the convex lens parts; and
wherein each of the second detection targets extends in a width direction of the convex lens parts perpendicular to the axial direction of the convex lens parts.

9. The recording apparatus according to claim 8;
wherein the ink absorbing layer has a plurality of pixel arrangement regions which are arranged in the width direction of the convex lens parts and in which the ink permeates to form pixels; and
wherein the first detection targets are a suppressing layer provided to divide the ink absorbing layer into a plurality of regions in the width direction of the convex lens parts and suppressing the ink from permeating to the two adjacent regions.

10. The recording apparatus according to claim 8;
wherein, under a condition that the posture determining mechanism detects that the posture of the recording medium is the first posture where the scanning direction and the width direction of the convex lens parts are substantially parallel to each other, the controller makes a moving speed of the ink-jet head in the scanning direction during the recording lower than a moving speed under a condition that the posture determining mechanism detects that the posture is the second posture where the scanning direction and the axial direction of the convex lens parts are substantially parallel to each other.

11. A lenticular sheet comprising:
a lenticular lens having a plurality of convex lens parts in a semi-columnar shape arranged in parallel to one another;
an ink absorbing layer provided on a surface, of the lenticular lens, opposite the plural convex lens parts; and
a detection target provided on the ink absorbing layer and detected by a detecting mechanism disposed in a recording apparatus;
wherein the detection target includes:
a plurality of first detection targets each extending in an axial direction of the convex lens parts and arranged along a width direction of the convex lens parts perpendicular to the axial direction of the convex lens parts; and
a plurality of second detection targets each extending in a width direction of the convex lens parts and arranged along the axial direction of the convex lens parts; and
at least one of an arrangement interval of the detection target, a shape of the detection target, a material of the detection target, and an optical property of the detection target is different among the plurality of first detection targets and the plurality of second detection targets.

12. A method for detecting a posture of a medium, comprising:
preparing the medium having a plurality of detection targets including:
a plurality of first detection targets each extending in a first direction and arranged at equal intervals in a second direction intersecting with the first direction at a predetermined angle; and
a plurality of second detection targets each extending in the second direction and arranged at equal intervals in the first direction;
moving a detecting mechanism detecting the detection targets relatively to the medium in a scanning direction which is parallel to the second direction under a condition that the medium is set in a reference posture; and
detecting a tilt of the medium from the reference posture, based on a detection result of the detection targets which is obtained by the detecting mechanism while moving in the scanning direction relatively to the medium before recording on the medium.

13. The method for detecting the posture according to claim 12;

wherein, at the time of the detection of the tilt, the tilt of the medium from the reference posture is detected based on a difference between times when the detecting mechanism detects two of the second detection targets while moving in the scanning direction relatively to the medium and based on an interval of the two second detection targets in the first direction.

14. The method of detecting the posture according to claim 12;

wherein at least one of an arrangement interval of the detection targets, a shape of the detection targets, a material of the detection targets, and an optical property of the detection targets is different among the first detection targets and the second detection targets; and wherein, based on the detection result of the detection targets by the detecting mechanism, it is determined whether the medium is in the first posture where the first direction and the scanning direction are substantially parallel to each other or in the second posture where the second direction and the scanning direction are substantially parallel to each other.

15. A posture detecting device which detects a tilt from a reference posture, of a medium on which a detection target is provided, the apparatus comprising:

a detecting mechanism which is movable in a scanning direction relatively to the medium to detect the detection target; and a posture determining mechanism which determines the tilt of the medium from the reference posture based on a detection result of the detection target, the detection result being obtained by the detecting mechanism while moving in the scanning direction relatively to the medium;

wherein as the detection target detected by the detecting mechanism, the medium has:

a plurality of first detection targets each extending in an intersecting direction intersecting with the scanning direction at a predetermined angle and arranged at equal intervals in the scanning direction; and a plurality of second detection targets each extending in the scanning direction and arranged at equal intervals in the intersecting direction, under a condition that the medium is in the reference posture;

wherein the first detection targets and the second detection targets are discriminatingly detected by the detecting mechanism; and wherein, based on the detection result of the detection targets by the detecting mechanism, the posture determining mechanism determines whether the medium is in a first posture where the arrangement direction of the plurality of first detection targets and the extension direction of the plurality of second detection targets are parallel to the scanning direction, or in a second posture where the extension direction of the plurality of first detection targets and the arrangement direction of the plurality of second detection targets are parallel to the scanning direction.

16. A method for detecting a posture of a medium, comprising:

preparing the medium having a plurality of detection targets including:

a plurality of first detection targets each extending in a first direction and arranged at equal intervals in a second direction intersecting with the first direction at a predetermined angle; and a plurality of second detection targets each extending in the second direction and arranged at equal intervals in the first direction;

moving a detecting mechanism detecting the detection targets relatively to the medium in a scanning direction which is parallel to the second direction under a condition that the medium is set in a reference posture; and detecting a tilt of the medium from the reference posture, based on a detection result of the detection targets which is obtained by the detecting mechanism while moving in the scanning direction relatively to the medium;

wherein at least one of an arrangement interval of the detection targets, a shape of the detection targets, a material of the detection targets, and an optical property of the detection targets is different among the first detection targets and the second detection targets; and wherein, based on the detection result of the detection targets by the detecting mechanism, it is determined whether the medium is in the first posture where the first direction and the scanning direction are substantially parallel to each other or in the second posture where the second direction and the scanning direction are substantially parallel to each other.

* * * * *